April 28, 1953

R. A. UNGER 2,636,281

MEASURING DEVICE

Filed Nov. 4, 1949

Inventor
Richard A. Unger
By his Attorney

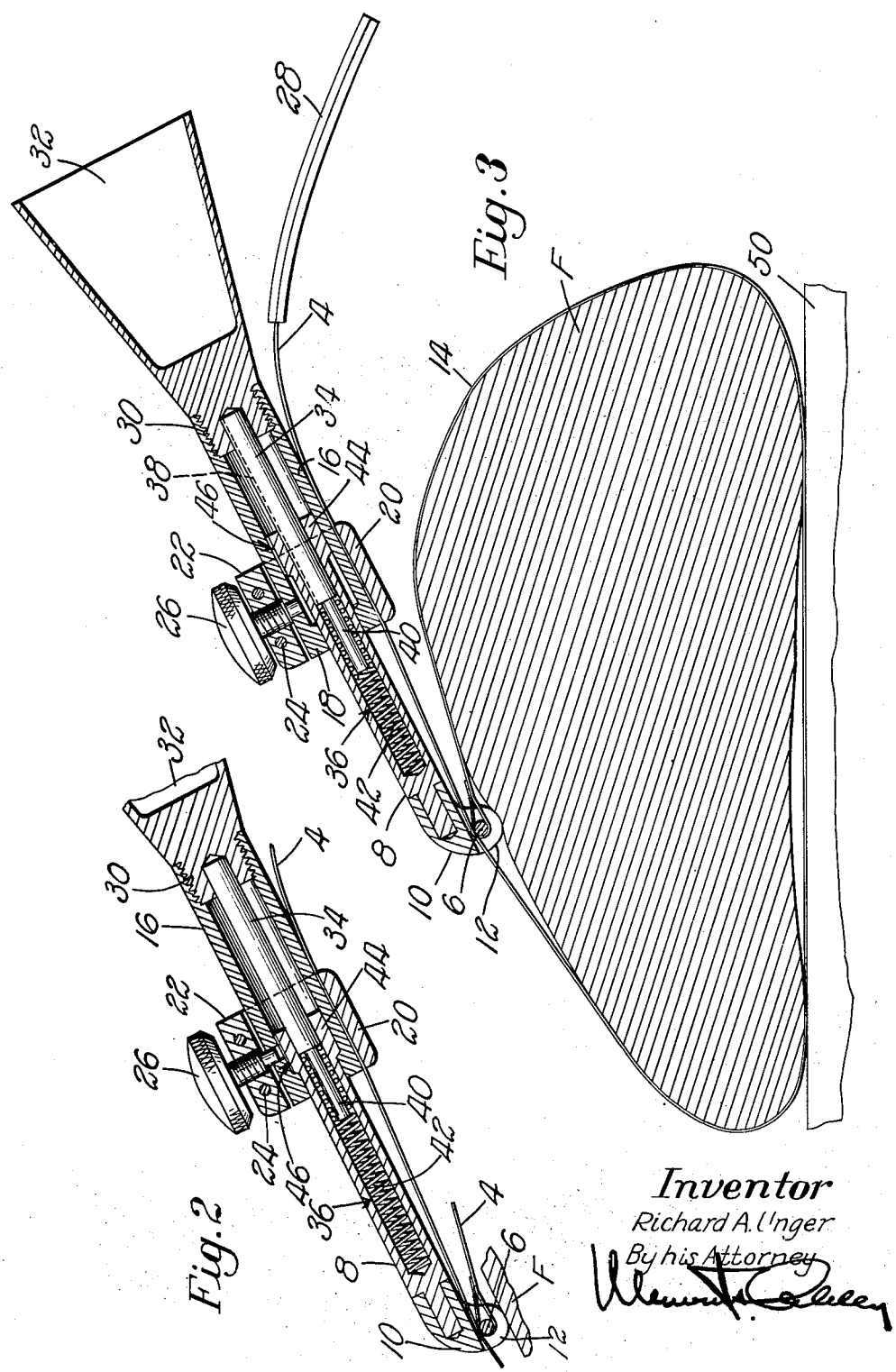

Patented Apr. 28, 1953

2,636,281

UNITED STATES PATENT OFFICE 2,636,281

MEASURING DEVICE

Richard A. Unger, Ipswich, Mass., assignor to United Shoe Machinery Corporation, Flemington, N. J., a corporation of New Jersey Application November 4, 1949, Serial No. 125,615

9 Claims. (Cl. 33—179)

This invention relates to measuring devices and more particularly to devices for measuring yieldable or compressible objects, such as human feet, the device being illustrated herein as being especially adapted for measuring the girths or transverse circumferences of such objects.

In measuring yieldable or compressible objects, such as feet or other parts of the body, the displacement of the flesh under the tension or pressure of the tape or other measuring instrumentality makes it difficult to obtain accurate measurements, especially when measuring the girths or circumferences of such objects where the tape or other measuring means must encircle a portion of the object being measured. It has been found difficult in some instances to obtain the same measurement twice on the same object owing to the different tensions or pressures exerted on the measuring means by different persons, or by the same person at different times. Efforts have been made in the past to overcome this difficulty in various ways but such efforts have usually resulted in complicated mechanisms or devices which were expensive to build, hard to operate, and which offered no definite assurance that the results obtained were any more accurate than those obtained by the usual methods.

Objects of the present invention are to overcome the difficulties referred to by providing an improved device for measuring yieldable or compressible objects which will be relatively simple in construction and economical to make, and which will be easy and convenient to operate but will produce accurate results.

A further object of the invention is to provide an improved measuring device of the type referred to which can be used advantageously for comparing corresponding measurements taken at the same location on two or more similar objects or on the same object at different times or by different individuals.

To the attainment of these objects and in accordance with one of its features, the present invention provides an improved measuring device comprising, in combination, a flexible tape for measuring an object, means for holding the tape, and means for supporting the holding means constructed and arranged to permit relative movement between the holding and supporting means when tension is applied to the tape. As illustrated herein, the tape holding means comprises a single, movable holder or plunger arranged for sliding movement in the supporting means, the latter comprising an elongated casing in which the plunger slides. Means is provided for normally opposing sliding movement of the holder in the supporting means or casing, this means, as herein illustrated, comprising a spring interposed between the plunger and casing and acting normally to maintain the plunger at the outer limit of its sliding movement in the casing but being arranged to yield under tension applied to the tape to permit the plunger to slide into the casing, thereby causing a yielding tension to be exerted on the tape as well as the positive tension applied thereto, for example, by an operator.

The tape is pivotally connected at one end to the single holder or plunger and is then looped below the plunger for encircling the objects to be measured and thus measuring the girths or circumferences thereof. The rest of the tape passes over its pivot on the plunger and extends through a guideway in a frame member surrounding the forward portion of the supporting member or casing, the other end of the tape being preferably provided with a handle whereby the tape can be conveniently grasped by the operator to apply tension to the tape and thereby adjust the size of the loop. As illustrated, the tape is graduated in accordance with any desired unit of measurement, for example, inches, and a scale is also formed on the plunger for indicating or measuring its sliding movement relatively to the casing, thereby measuring the tension applied to the tape.

In accordance with another feature of the invention, the device is also provided with means for holding or retaining a particular measurement taken on an object in order to compare this measurement with a corresponding measurement taken on a similar object, such, for example, as a cast of the object or, if desired, to compare this measurement with the same measurement taken again on the same object in order to test the accuracy of the first measurement.

The means for retaining a measurement on the device comprises a clamping member which, as herein illustrated, is in the form of a screw arranged to clamp the tape in a guideway provided in the frame member referred to by forcing the supporting member against the frame member and thereby clamping the tape between said members to lock the tape in the position into which it has been moved by the tension exerted thereon. In this way, a measurement of an object can be retained and the device can be used to take the same measurement again on the object or on a similar object, thereby indicating whether or not the two measurements are exactly the same under the same tension. If they are not, the tape can be released and the girth measurement of the second object under the same tension can then be obtained. The spring referred to returns the parts of the device to their initial relative positions after the tension on the tape has been relieved.

With the above and other objects and features in view, the invention will now be described in detail in connection with the accompanying drawings and will thereafter be pointed out in the claims.

In the drawings,

Fig. 2 is a longitudinal sectional view of the device on a slightly reduced scale with the handle broken off and the device shown in an idle or inoperative position; and Fig. 3 is a sectional view similar to Fig. 2 showing the device in operation, the device being used in this instance to take a girth measurement at approximately the ball line of a foot.

Figure 1:
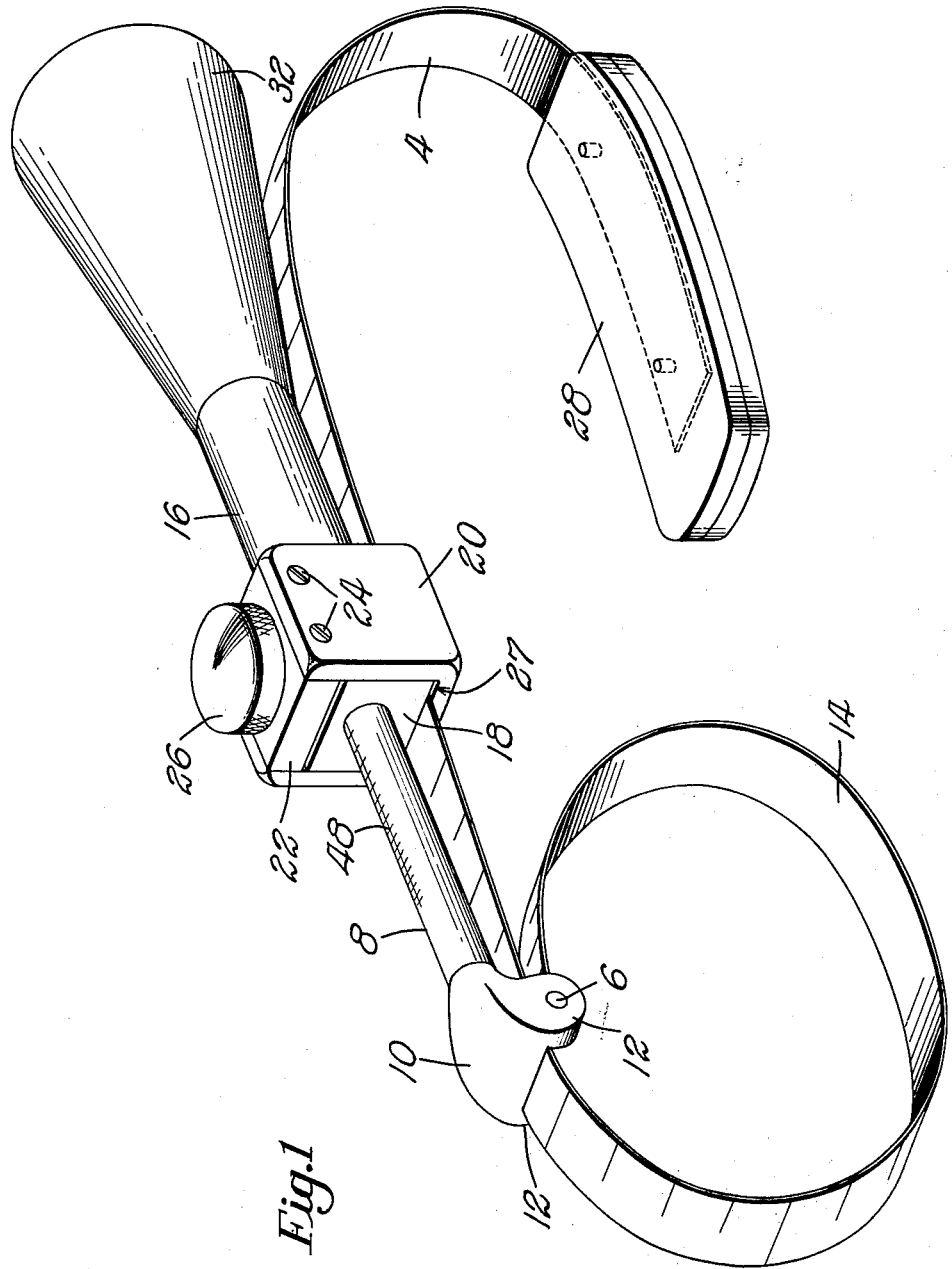
Fig. 1 is a perspective view, on a greatly enlarged scale, of the device which forms the subject matter of the present invention.

The measuring device comprises a flexible tape 4 usually composed of thin metal and having one end pivotally connected by a pin 6 to the forward end of a holder or plunger 8, this end of the plunger, as shown in the drawings, preferably comprising a bifurcated member 10 fastened to or integral with the plunger and provided with ears 12 between which the pin 6 extends. As illustrated in Figs. 1 and 3, the flexible measuring tape 4 extends from the pivot 6 in a downwardly hanging loop 14 and then passes over the pin 6 between the ears of the member 10, the loop 14 being especially adapted to measure the girths of yieldable or compressible objects such, for example, as human feet. The tape may be graduated in accordance with any desired unit of measurement, for example, inches or centimeters.

The holder or plunger 8 is carried by a supporting member 16 comprising an elongated hollow casing, the forward portion 18 of which, as illustrated in Fig. 1, is a rectangular in shape and fits into a U-shaped frame member 20 closed at the top by a plate 22 secured to the frame by screws 24. The supporting member 16 is retained in position in the frame 20 by a thumb screw 26 threaded through the plate 22 and having a reduced lower end extending into a hole in the supporting member. As will be seen from the drawings, the flexible tape 4 passes from the bifurcated member 10 rearwardly through an opening or guideway 27 (Fig. 1) which is provided between the frame member and the rectangular forward portion of the casing 16, the tape then extending further rearwardly into a position to be grasped by an operator when using the device, the rear end of the tape being provided with a handle 28 whereby it can be conveniently gripped by the operator.

It will be seen from the foregoing that the flexible tape 4 may be clamped in the guideway 27 between the frame 20 and the rectangular portion 18 of the supporting member 16 by tightening the thumb screw 26, the shoulder on the screw forcing the supporting member against the lower side of the frame. In this way, the tape 4 can be locked in the device in any position into which it may have been moved by tension exerted thereon when taking the measurement of a foot or other yieldable object.

The rearward end of the hollow casing 16 is tapped to provide threads 30 and a handle 32 is threaded therein, this handle, as illustrated in the drawings, preferably being substantially frusto-conical in shape and being hollow so that it may conveniently fit over the thumb of an operator or be gripped between the thumb and forefinger of the operator. The handle 32 has a pin 34 fixed in its forward end which projects forwardly through the opening in the casing 16 and enters a hole 36 bored in the plunger 8, the pin having a sliding fit in the plunger and being provided on its upper side with a small groove 38 which acts as an air vent. The forward portion of the pin 34 is reduced in size, as shown in Figs. 2 and 3, to form a pilot 40. A spring 42 surrounds the pilot and bears at one end against the shoulder on the pin 34 and, at its opposite end, against the bottom of the hole 36 in the plunger. As illustrated in Figs. 2 and 3, the rear portion of the plunger is enlarged at 44 to provide a sliding fit in the casing 16, another groove 46 being provided in this enlarged portion 44 to prevent trapping of the air and thus interfering with the operation of the plunger. As illustrated in Fig. 1, the upper side of the plunger has a scale 48 formed thereon which may be graduated into any desired units of measurement, for example, inches, and which may be utilized to measure the amount of tension exerted on the tape when measuring a yieldable object, such as a foot, this tension being indicated by the distance that the plunger slides inwardly into the supporting member 16 when measuring the object.

In using the device, the object to be measured, for example, the human foot F illustrated in Fig. 3, is preferably placed on a flat surface or support 50 under relatively light pressure in order that the foot may assume a substantially natural or normal position. The loop 14 of the tape is passed around the toe end of the foot and is moved longitudinally thereof to the ball line portion or, if desired, to some selected point along the instep portion, the operator preferably operating the device by inserting his thumb in the handle 32 and gripping the tape 4 between his fingers and the handle 32. If more convenient, the operator can grasp the handle 28 of the tape with his other hand. After he has positioned the loop 14 lengthwise of the foot in a proper position to take the desired girth measurement, he exerts tension on the tape either by his fingers or by pulling the handle 28, thereby tightening the tape around the foot. As the tension on the tape increases, the end which is pivotally connected to the plunger 8 forces the plunger rearwardly into the supporting member 16 against the action of the spring 42, thereby compressing the spring. When the operator has tightened the tape around the object sufficiently to obtain an accurate girth measurement, the forward end of the device, that is, the ears 12, will be pressed slightly into the foot, as illustrated in Fig. 3. The operator may then read the girth measurement directly from the scale on the tape at the front end of the plunger 8, where the tape passes into the bifurcated member 10 on the plunger. He may also measure the tension applied to the tape by the scale 48 on the plunger.

If it should be desired to hold or retain this girth measurement to compare it with the corresponding measurement of the other foot, with the girth measurement of a plaster cast of the foot or for any other purpose, the measurement may be retained in the present device by tightening the thumb screw 26 which, as stated above, will clamp the flexible tape 4 in the guideway 27 between the frame 20 and the rectangular portion 18 of the supporting member 16 and thereby lock the tape in the position into which it was moved by the tension exerted thereon. The clamping of the tape in this manner holds the plunger 8 in its rearward position in the supporting member or casing 16 only as long as the tape remains around the object being measured. The tape can be removed from the foot or other object while still clamped, if desired, by pressing the plunger further inwardly into the supporting member by hand to provide sufficient slack in the tape to permit its removal from the object. Removal of the tape from the object will permit the plunger to slide forwardly again to the forward limit of its movement in the supporting member, as illustrated in Fig. 2. Since the tape is now clamped between the frame 20 and the portion 18 of the supporting member 16, the position of the tape when the measurement was taken is retained and the device can be used, if desired, to measure the opposite foot, a cast of the foot or some other object while the tape is still locked to determine whether the foot or cast has exactly the same girth measurement as the foot that was first measured. If the second measurement utilizes exactly the same amount of tape as the first measurement, the two objects have the same girth measurement. If, however, the tape must be unclamped and released in the guideway 27 or pulled more tightly therethrough to produce a larger or smaller loop for the second object, the girth measurement of the two objects is, of course, different.

This scale 48 on the plunger 8 is important in the present device because it enables an operator to measure the tension applied to the tape and thus be able to exert exactly the same tension on the tape for each object measured. This is particularly advantageous when measuring yieldable or compressible objects, such as human feet or articles composed of rubber, felt, or other yieldable materials. Accordingly, whether measuring a person's feet or measuring yieldable objects which differ substantially in size, it is always possible by means of the scale on the plunger to apply exactly the same tension or pressure to the tape regardless of how much tape is needed to measure the girth of the object. This feature of the device, therefore, makes it possible for an operator to obtain accurate girth measurements of yieldable objects and to repeat the operation as many times as may be necessary with the same results. It also enables him to apply the same tension to the tape when measuring different sized objects or to apply more or less tension in one case than another if that should be necessary or desirable. Consequently, with the present measuring device comparisons may be made of girth measurements of the same object under the same tension or under different tensions to observe the amount of compression. Moreover, girth measurements of yieldable objects and non-yieldable or rigid objects may be made under the same tension or under different tensions and may then be compared. Whenever desired, the tape may be clamped, as indicated above, to hold the tape in position and thus permit a quick comparison of a girth measurement of one object with the corresponding girth measurement of another object.

In using the device under normal conditions, it will not ordinarily be necessary to tighten the thumb screw 26 to clamp and lock the tape between the frame 20 and casing 16, this being necessary only when it is desired to retain the girth measurement of a particular object in order to compare this measurement quickly with the corresponding girth measurement of another object. In ordinary practice, therefore, the screw 26 is left retracted, as shown in Fig. 2, and the spring 42 permits yielding movement of the holder or plunger 8 relatively to the supporting member 16 whenever tension is exerted on the flexible tape 4 to draw it around the object being measured. After the desired tension has been applied to the tape 4, as indicated by the scale 48 on the plunger, the girth measurement is read from the tape at the front end of the bifurcated member 10 on the plunger 8, after which the tension on the tape is relieved to permit the spring 42 to return the plunger to the forward limit of its sliding movement in the supporting member 16, this position being that in which the enlarged portion 44 of the plunger engages the reduced opening at the forward end of the supporting member 16, as shown in Fig. 2. It will be observed that the present device can be conveniently held and operated by an operator with the thumb and fingers of one hand merely by placing the hollow handle 32 of the device over his thumb and then gripping the tape between his fingers and the handle 32, thereby permitting the operator to exert tension on the tape with his fingers while leaving his other hand free to hold or support the object being measured or, if desired, to tighten the screw 26 to lock the tape 4 in the device and thus retain the tape in the position in which the measurement was taken. Moreover, the operator can also use his other hand for adjusting the tape 4 properly around the object, if necessary, in order to obtain an accurate girth measurement at a particular point or location, such adjustment sometimes being desirable when measuring yieldable or compressible objects such as human feet.

While the invention has been disclosed herein with reference to a device particularly adapted for taking girth measurements of yieldable or compressible objects, such as human feet, it should be understood that the device is not limited in its use to taking such measurements or operating upon such objects since it may be used with equally advantageous results for taking girth measurements of solid or non-yieldable objects, such as plaster casts or lasts, and it can also be used for taking measurements other than girth measurements, for example, measurements of the peripheries or outlines of yieldable or non-yieldable objects.

Having thus described my invention, what I claim as new and desire to secure by Letters Patent of the United States is:

1. A girth measuring device comprising, in combination, an elongated casing having a guideway, a plunger slidable in said casing, resilient means for normally causing the plunger to project a predetermined distance from the casing, a flexible tape having one end pivotally connected to the projecting end of said plunger and the rest of the tape being looped and passing over the pivot on the plunger and then extending through the guideway in the casing, the opposite end of said tape being free to be gripped by an operator using the device, said resilient means normally holding the plunger in its initial position in the casing but yielding under sliding movement of the plunger in said casing when tension is exerted on the free end of the tape, and a scale on said plunger for indicating the amount of its sliding movement in the casing and thereby determining the tension applied to the free end of the tape.

2. A girth measuring device comprising, in combination, a hollow elongated casing having a guideway therein, a plunger slidable in said casing and normally projecting outwardly a predetermined distance therefrom, a flexible tape one end of which is pivotally connected to the projecting end of the plunger and the rest of which is curved into a complete loop and passes over the pivot on said plunger and then extends through the guideway in the casing, the opposite end of said tape being adapted to be grasped by an operator when measuring an object, spring means between said plunger and casing for holding the plunger in its normal position in the casing but yieldingly resisting sliding movement of the plunger into the casing when tension is exerted on said opposite end of the tape, said plunger having a scale thereon whereby the amount of its sliding movement may be determined, said scale indicating the amount of tension exerted on the tape when measuring the girth of an object, and means for locking the tape in said guideway to retain the measurement taken of the object without preventing sliding movement of the plunger in said casing.

3. A measuring device comprising, in combination, a flexible tape, single movable means for holding said tape so that it forms a loop, means for supporting the single movable means for movement relatively to the supporting means when tension is applied to the tape, means for yieldingly resisting movement of the single movable means as the loop is tensioned, means for indicating the size of the loop in the tape after tension has been applied thereto, and means for measuring said tension.

4. A measuring device comprising, in combination, a flexible measuring tape, a movable holder for supporting said tape so that it forms a complete loop, means for supporting said holder for movement relatively to the supporting means when tension is exerted on one end of the tape, resilient means for yieldingly resisting such movement, means on the holder for indicating the size of the loop after the holder has moved in response to tension on the tape, and means on said supporting means for indicating the amount of said movement, thereby measuring the tension exerted on said tape.

5. A measuring device comprising, in combination, a flexible measuring tape, a movable holder for supporting said tape so that it forms a complete loop at one end of said holder, means for supporting the opposite end of the holder for sliding movement relatively to the supporting means if tension is applied to the tape, resilient means carried by said holder and engaging the supporting means for normally opposing sliding movement of the holder, said resilient means yieldingly resisting said sliding movement when tension is exerted on the tape to decrease the size of the loop, and means on said holder for indicating the size of said loop after sliding movement of the holder has taken place.

6. A measuring device comprising, in combination, a flexible measuring tape, a single movable holder for supporting said tape so that it forms a complete loop at one end of the holder, one end of said tape being pivotally connected to said holder and the other end of the tape passing between the holder and the pivotal connection of its first end and extending into a position to be grasped by an operator, means for supporting said holder for sliding movement in the supporting means, a spring between said holder and said supporting means for normally opposing sliding movement of the holder in said supporting means, said spring yieldingly resisting the sliding movement of the holder when tension is applied to the end of the tape held by the operator, and means on the holder for indicating the amount of tension applied to the end of the tape by the operator.

7. A measuring device comprising, in combination, a flexible tape, a plunger for holding said tape so that it forms a closed loop which is adjustable by applying tension to the tape, means for supporting the plunger, said plunger being movable relatively to the supporting means when tension is applied to the tape to change the size of said loop, resilient means between the plunger and said supporting means for normally maintaining the plunger in a predetermined position relatively to said supporting means, said resilient means yieldingly resisting relative movement of the plunger and supporting means when the tape is put under tension, and means on said plunger for indicating both the size of the loop after tension is applied to the tape and the extent of movement of the plunger relatively to the supporting means, thereby indicating the amount of tension put on the tape.

8. A measuring device comprising, in combination, a flexible measuring tape, single movable means for holding said tape so that it forms a closed loop, said loop being adjustable relatively to the single means by applying tension to the tape, means for supporting said single means for sliding movement relatively to the supporting means when tension is exerted on the tape to adjust said loop, and means for maintaining the loop in its adjusted position without interfering with the sliding movement of the single means relatively to the supporting means.

9. A measuring device comprising, in combination, a flexible tape, holding means and a support therefor, said tape being pivoted to the holding means with its free end passed between the pivot and the holding means to form a complete loop, said free end lying adjacent to the support, said holding means being movable relatively to said support, resilient means acting to move the holding means relatively to the support in a direction to tension the loop, and a handle on the support having a conical recess to receive the operator's thumb, the free end portion of the tape being then accessible to the operator's fingers.

RICHARD A. UNGER.

References Cited in the file of this patent

UNITED STATES PATENTS

| Number | Name | Date |
| --- | --- | --- |
| 263,971 | Schaefer | Sept. 5, 1882 |
| 650,389 | Hatfield | May 29, 1900 |
| 740,943 | Summersby et al. | Oct. 6, 1903 |
| 1,233,131 | Schwartz | July 10, 1917 |
| 1,238,841 | Snider | Sept. 4, 1917 |
| 2,241,451 | Fist | May 13, 1941 |
| 2,271,725 | Tunnicliff | Feb. 3, 1942 |

FOREIGN PATENTS

| Number | Country | Date |
| --- | --- | --- |
| 593,308 | Germany | Mar. 5, 1934 |